R. S. PEASE.
DRAWING RING.
APPLICATION FILED NOV. 24, 1911.
1,155,507.
Patented Oct. 5, 1915.
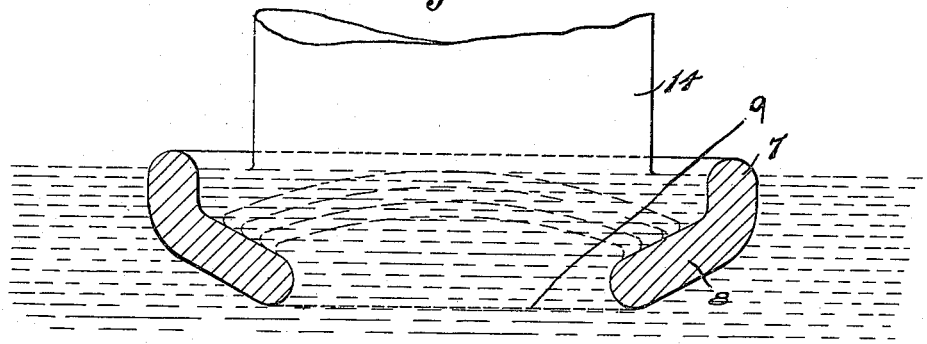
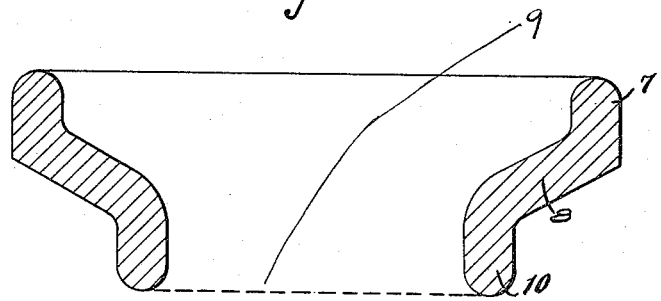
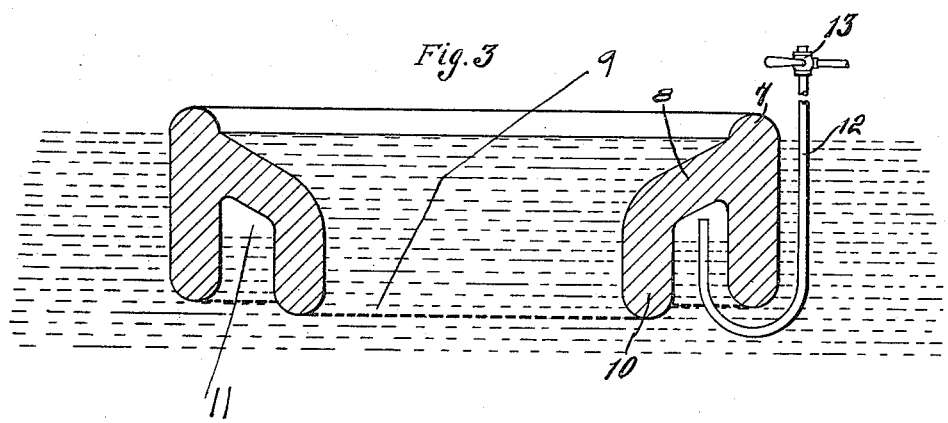
WITNESSES:
INVENTOR.
Roger S. Pease
BY
ATTORNEY.

UNITED STATES PATENT OFFICE.

ROGER S. PEASE, OF PITTSBURGH, PENNSYLVANIA, ASSIGNOR TO THE PITTSBURGH PLATE GLASS COMPANY, OF PITTSBURGH, PENNSYLVANIA, A CORPORATION OF PENNSYLVANIA.

DRAWING-RING.

1,155,507. Specification of Letters Patent. Patented Oct. 5, 1915.

Application filed November 24, 1911. Serial No. 662,226.

*To all whom it may concern:*

Be it known that I, ROGER S. PEASE, a citizen of the United States, residing at Pittsburgh, in the county of Allegheny and State of Pennsylvania, have invented certain new and useful Improvements in Drawing-Rings, of which the following is a specification.

The invention relates to drawing rings employed in the manufacture of glass articles and particularly in the drawing of glass cylinders for making window glass. Among the chief objects of the invention are; the provision of an improved drawing ring so constructed that the molten glass from the deeper portions of the tank may flow freely into the ring; and the provision of an improved drawing ring of the character specified wherein the glass entering the ring from the body of molten glass will be carried first to the center of the ring and then outward adjacent the drawing point. These together with such other objects as may hereinafter appear, or are incidental to my invention, I attain by means of a construction illustrated in preferred form in the accompanying drawings, wherein—

Figure 1 is a section through one embodiment of my invention, and Figures 2 and 3 are similar sections through modifications of my invention.

It has been found in the manufacture of glass that the purest and best glass, and that which is most suitable for drawing glass articles, such as cylinders for the making of window glass, is in the deeper portion of the body of molten glass in the glass tank, any extraneous matter and impurities rising to the upper portion of the glass. In pursuing the method of drawing glass disclosed in my copending application, Serial Number 659,353, filed November 9th, 1911, the impure glass and any extraneous substances are removed by first submerging the drawing ring and then in removing such glass and extraneous matter by a skimming process. My present invention has relation to an improved form of drawing ring to be used in connection with this method, although it is also applicable to other methods of drawing glass.

As stated one of the chief objects of the invention is to provide a drawing ring through which, in the drawing operation, glass from the deeper portions of the tank will freely flow in such manner that only the purest of the glass will be utilized to form the cylinder being drawn. To this end I provide a drawing ring which is generally of a dish-shape, but has a side wall 7 from which an annular inclined flange or bench 8 projects inwardly and downwardly. The orifice through which the glass enters the ring is indicated by the numeral 9. When the drawing ring is being submerged and during the continuance of the drawing operation, the glass entering the ring through the orifice wells up and rolls up the top of the inclined bench 8, thus following a course approximately outlining the shape of a mushroom, as it indicated diagrammatically in Figure 1. The mushroom shaped body or form of the glass then turns inside out, acting as a self skimming process carrying radially outward the impurities of the surface. That is to say, the central portion of glass coming through the orifice wells up and in a measure rolls over the portions adjacent the surface of the glass and forces them to the sides of the ring. The fresh glass welling up through the orifice during the course of the drawing will thus be used to form the cylinder. The advantage of this is that the best and purest glass from the deep portions of the tank is drawn into the ring and is carried to the sides of the ring to the point from which the cylinder 14 is being drawn (see Figure 1). In order to secure the glass from still deeper portions of the tank, the bench 8 may be provided adjacent its edges with a downwardly projecting collar 10 which will materially increase the depth of the drawing ring and thus secure a flow of glass from the deeper portions only of the tank. Figures 2 and 3 indicate drawing rings of the same general type as that shown in Figure 1 but provided with such a collar, Figure 2 differing from Figure 1 in this respect only.

In Figure 3 I have shown a modified form of drawing ring in which there is made a provision for varying the floating level of the ring, which may be of advantage in different needs which may arise in practice. For this purpose, I have provided the ring with the side wall 7 of greater depth than in the types shown in Figures 1 and 2, and the bench portion 8 projects from the upper portion of the side wall and is provided with a collar 10 as before. The space between the collar and the side wall thus constitutes an annular recess 11, which will trap a certain portion of air as it is placed in the tank, or the gas which rises from the molten glass. In order to release a portion of this entrained air or gas, or for the purpose of adding to the supply, I have provided a pipe 12 which leads to the recess from a suitable source of fluid pressure and is governed by a valve mechanism 13 which will release or exhaust the entrained air to the atmosphere or add to the supply as above indicated.

The chief advantage of securing a flow of glass from the deep portions of the tank is that the pure glass thus obtained will form a cylinder of the best possible quality, devoid of any imperfections due to impurities in the glass, which imperfections result in breakage of the cylinder and consequent loss. The making of the outer surface of the bench inclined is of advantage in that any bubbles rising through the glass are deflected away from the interior of the ring and kept out of the cylinder being drawn. Other advantages of the construction will appear to those familiar with the art.

Having thus described my invention and illustrated its use what I claim as new and desire to secure by Letters Patent is the following:—

1. In combination in drawing apparatus, a ring lying partially submerged in a body of glass and comprising a conical bench having its inner and outer surfaces converging downwardly and provided at its lower end with a downwardly projecting collar having its lower edge free and projecting into the body of glass.

2. In combination in a drawing apparatus, a ring lying partially submerged in a body of glass and comprising a conical annular bench open at the bottom and having its inner and outer surfaces converging downwardly whereby the body of glass in the ring is partially segregated from the glass beneath the ring but is in free communication therewith.

3. A drawing ring comprising a body portion provided with an annular recess formed in the normally submerged portion of the ring, and means for admitting fluid under pressure into the recess.

4. A drawing ring comprising a body portion provided with a recess in the lower face which is normally submerged in the glass, and means for admitting fluid under pressure into the recess.

5. A drawing ring comprising a body portion provided with a recess in the lower face which is normally submerged in the glass, and means for exhausting the gas given off by the glass and collecting in the recess.

6. A drawing ring comprising a side wall, an inwardly and downwardly projecting bench portion extending therefrom intermediate the ends of the side wall, a collar projecting downwardly from the bench and spaced away from the side wall, and means for admitting fluid into the annular recess or cavity between the collar and side wall.

7. A drawing ring comprising a side wall, an inwardly and downwardly projecting bench portion extending therefrom intermediate the ends of the side wall, a collar projecting downwardly from the bench portion and spaced away from the side wall, a pipe leading from the recess or cavity between the collar and the side wall, and a valve for controlling the pipe.

In testimony whereof, I have hereunto signed my name in the presence of the two subscribing witnesses.

ROGER S. PEASE.

Witnesses:
LETITIA A. MYERS,
DOERING BELLINGER.

Copies of this patent may be obtained for five cents each, by addressing the "Commissioner of Patents, Washington, D. C."